N. W. CONDICT, Jr.
Portable Railway.

No. 9,298. Reissued July 13, 1880.

WITNESSES

H. L. Fulenwider.
Henry Howson Jr.

INVENTOR

Nathan W. Condict Jr.
by his Attorneys.
Howson and Son

N. PETERS, PHOTO-LITHOGRAPHER, WASHINGTON, D. C.

UNITED STATES PATENT OFFICE.

NATHAN W. CONDICT, JR., OF JERSEY CITY, NEW JERSEY.

PORTABLE RAILWAY.

SPECIFICATION forming part of Reissued Letters Patent No. 9,298, dated July 13, 1880.

Original No. 204,007, dated May 21, 1878. Application for reissue filed May 20, 1880.

*To all whom it may concern:*

Be it known that I, NATHAN W. CONDICT, Jr., a citizen of the United States of America, residing in Jersey City, New Jersey, have invented certain Improvements in Portable Railways, of which the following is a specification.

My invention relates, first, to the construction of sections of a portable railway; and it consists of the combination of two rails and transverse and diagonal ties, all of wrought-iron, and permanently secured together, so as to form a self-contained section; and secondly, my invention relates to a mode of fitting one section of a portable railway to another section; and it consists in providing the rails of one section with shoes permanently secured to the said rails and projecting therefrom, so as to receive the shoeless ends of the rails of an adjoining section.

Figure 1:
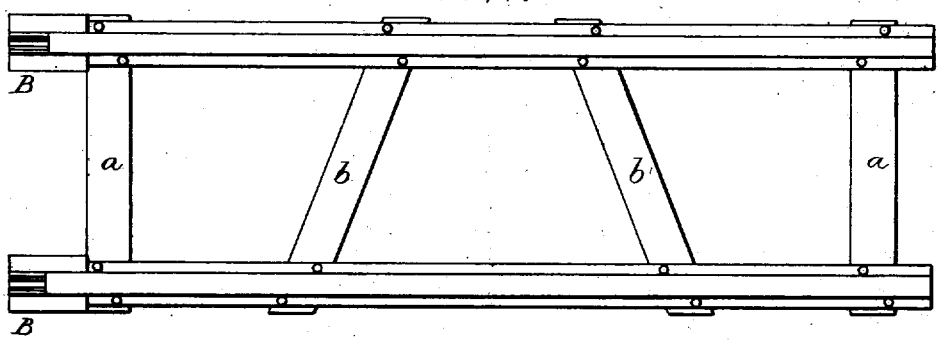
Figure 2:
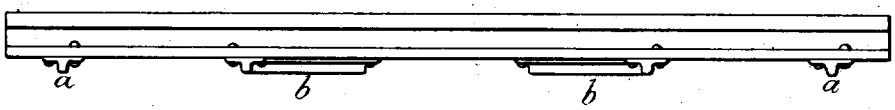
Figure 3:
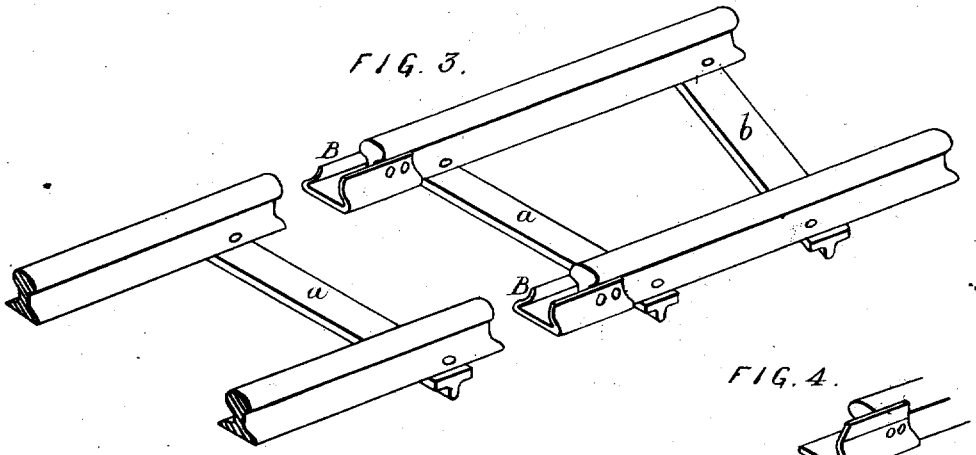
Figure 4:
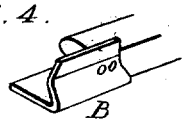

In the accompanying drawings, Figure 1 is a plan view of a section of my improved portable railway; Fig. 2, a side view of the same; Fig. 3, a perspective view, showing parts of two adjoining sections with coupling-shoes; Fig. 4, a perspective view, showing a modified coupling-shoe; and Fig. 5, a plan view, drawn to a reduced scale, and showing a modified arrangement of coupling-shoes on a section composed of rails and connecting-ties.

Each section of the track shown in Figs. 1 and 2 consists of two rails connected together by transverse bars *a a* and diagonal bars *b b*, of wrought-iron, so that the two rails may always be maintained in their proper relative positions, both longitudinally and laterally, thereby rendering the sections self-contained.

I prefer to make these transverse and diagonal bars of T-iron, as it is comparatively light and at the same time rigid, while the flanges afford the best opportunity for riveting the bars to the flanges of the rails.

The number and arrangement of the transverse and diagonal bars will depend mainly upon the length of the sections; but I may remark that I prefer to make these sections comparatively short, especially if the railway has to be laid in a locality which is not easy of access by the usual means of transportation.

The self-contained sections can be laid far more cheaply on the road-bed than ordinary rails, and the sections may be spiked to longitudinal sleepers instead of the usual cross-ties, the latter being unnecessary, owing to the self-contained character of the sections, which in many cases may be laid directly on the ground without intervening foundation.

To one end of each section are permanently riveted two coupling-shoes, B B, Fig. 3, one to each rail. These shoes I prefer to make of bar or plate iron, bent to conform to the shape of the rail, the portion of the shoe which projects beyond the end of the rail of one section forming a socket for the reception and confinement of the end of one of the rails of the adjoining section.

Figure 5:
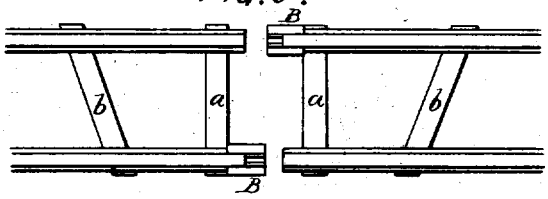

Each section may be provided with shoes, as shown in Fig. 5—that is, one rail may have a shoe at one end of the section and the other rail a shoe at the opposite end of the section.

The shoes may be made in the manner shown in Fig. 3, each shoe having a base which may be riveted to the flange of the rail and a flange riveted to the web of the rail on the outer side of the same, and extending upward to the tread, so as to bridge the joint between the rails.

The permanent fastening of the shoes to the rails of each section is an important feature, as it facilitates the laying of the track, in doing which all that is necessary is to adjust the rails of one section to the sockets presented by the projecting ends of the shoes of the other section.

I am aware that portable wooden frames composed of longitudinal, diagonal, and transverse beams have been in use as foundations for rails in laying railways; this, therefore, I do not claim, but

I claim as my invention—

1. The within-described self-contained section of a railway, consisting of two rails and transverse and diagonal bars, all of wrought-iron, and permanently secured together, as set forth.

2. The combination of the section of a portable railway with shoes B, permanently secured to the rails of the said section, substantially as and for the purpose described.

In testimony whereof I have signed my name to this specification in the presence of two subscribing witnesses.

NATHAN W. CONDICT, JR.

Witnesses:
WILLIAM P. DOUGLASS,
J. A. ROMEYN.